US011549718B2

(12) United States Patent
Ryu

(10) Patent No.: US 11,549,718 B2
(45) Date of Patent: Jan. 10, 2023

(54) AIR CONDITION MEASUREMENT APPARATUS AND METHOD

(71) Applicant: Samsung Electronics Co., Ltd., Gyeonggi-do (KR)

(72) Inventor: Hun-Young Ryu, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 575 days.

(21) Appl. No.: 16/480,059

(22) PCT Filed: Jan. 9, 2018

(86) PCT No.: PCT/KR2018/000407
§ 371 (c)(1),
(2) Date: Jul. 23, 2019

(87) PCT Pub. No.: WO2018/139783
PCT Pub. Date: Aug. 2, 2018

(65) Prior Publication Data
US 2019/0368768 A1    Dec. 5, 2019

(30) Foreign Application Priority Data

Jan. 24, 2017  (KR) .......................... 10-2017-0011249

(51) Int. Cl.
*F24F 11/89*     (2018.01)
*F24F 11/77*     (2018.01)
(Continued)

(52) U.S. Cl.
CPC .............. *F24F 11/89* (2018.01); *F24F 11/77* (2018.01); *F24F 2110/64* (2018.01); *G01N 21/53* (2013.01)

(58) Field of Classification Search
USPC ........................................................ 454/256
See application file for complete search history.

(56) References Cited

U.S. PATENT DOCUMENTS 6,369,890 B1 *  4/2002  Harley ................... G01N 21/53
                                                        356/336
7,677,962 B2 *  3/2010  Chang ................ H05K 7/20181
                                                        361/679.48
(Continued)

FOREIGN PATENT DOCUMENTS

CN      204404386 U       6/2015
CN      104913388 A  *    9/2015   ............ F24F 1/0003
(Continued)

*Primary Examiner* — Edelmira Bosques
*Assistant Examiner* — Frances F. Hamilton
(74) *Attorney, Agent, or Firm* — Cha & Reiter, LLC

(57) ABSTRACT

The air condition measurement apparatus according to various embodiments of the present invention comprises: a housing comprising a first space and a second space therein; a light-emitting unit which is positioned inside the housing, comprises a first lens, and radiates light to air flowing into the housing; a light-receiving unit which is positioned inside the housing, comprises a second lens, and receives reflected light formed from the reflection of the radiated light, radiated from the light-emitting unit, by foreign substances included in the air; a blocking member which transmits the radiated light or the reflected light and separates the first space, in which the light-emitting unit or the light-receiving unit is disposed, from the second space; and a control unit, wherein the control unit may be configured to measure the condition of air on the basis of a signal corresponding to the reflected light received by the light-receiving unit. Other various embodiments may be possible.

7 Claims, 15 Drawing Sheets

(51) Int. Cl.
*F24F 110/64* (2018.01)
*G01N 21/53* (2006.01)

(56) References Cited

U.S. PATENT DOCUMENTS

| | | | |
|---|---|---|---|
| 8,901,512 B2 * | 12/2014 | Fujita | G01N 15/10 250/462.1 |
| 2007/0013910 A1 * | 1/2007 | Jiang | G01N 21/6486 356/336 |
| 2012/0257192 A1 * | 10/2012 | Jiang | G01N 21/645 356/73 |
| 2014/0240701 A1 * | 8/2014 | Wynn | G01N 21/05 356/246 |
| 2015/0001405 A1 * | 1/2015 | Fujita | B03C 3/41 250/365 |
| 2015/0153275 A1 * | 6/2015 | Park | G01N 33/0027 356/336 |
| 2017/0227436 A1 * | 8/2017 | Park | G01N 21/53 |

FOREIGN PATENT DOCUMENTS

| | | | | |
|---|---|---|---|---|
| DE | 102013013709 A1 * | 8/2014 | | G01N 21/05 |
| EP | 3168604 A1 * | 5/2017 | | B03C 3/017 |
| GB | 2309076 A * | 7/1997 | | G01N 21/53 |
| JP | 06-109633 A | 4/1994 | | |
| JP | 3263085 B2 * | 3/2002 | | G01N 21/53 |
| JP | 2007121145 A * | 5/2007 | | |
| JP | 2011083214 A * | 4/2011 | | |
| JP | 2016-90194 A | 5/2016 | | |
| KR | 0168266 B1 * | 8/1996 | | |
| KR | 100309638 B1 * | 3/1997 | | |
| KR | 100653220 B1 * | 3/1997 | | |
| KR | 10-2004-0075452 A | 8/2004 | | |
| KR | 10-2005-0040122 A | 5/2005 | | |
| KR | 10-0653220 B1 | 4/2007 | | |
| KR | 101319801 B1 * | 12/2007 | | |
| KR | 20080058181 A * | 12/2007 | | |
| KR | 10-2010-0086781 A | 8/2010 | | |
| KR | 10-0979820 B1 | 9/2010 | | |
| KR | 10-1076933 B1 | 10/2011 | | |
| KR | 10-1305772 B1 | 9/2013 | | |
| KR | 10-1319801 B1 | 10/2013 | | |
| KR | 10-1535557 B1 | 7/2015 | | |
| WO | WO-2015036204 A1 * | 3/2015 | | G01N 15/0205 |
| WO | WO-2017102545 A1 * | 6/2017 | | |

\* cited by examiner

AIR CONDITION MEASUREMENT APPARATUS AND METHOD

CROSS-REFERENCE TO RELATED APPLICATION(S)

This application is a National Phase Entry of PCT International Application No. PCT/KR2018/000407, which was filed on Jan. 9, 2018, and claims priority to Korean Patent Application No. 10-2017-0011249, which was filed on Jan. 24, 2017, the contents of which are incorporated herein by reference.

BACKGROUND

1. Field

Various embodiments of the disclosure relate to air condition measurement apparatus and a method thereof.

2. Description of the Related Art

An air condition measurement apparatus may be a device for measuring the concentrations of foreign substances contained in the air. The air condition measurement apparatus may measure foreign substances in the interior of a building, such as an office or home, and the user may check the measured concentrations of foreign substances, thereby operating an air purifier. The air condition measurement apparatus may be connected to an air purifier, or may be combined with an air purifier to thus drive the air purifier according to the measured concentrations of foreign substances.

SUMMARY

Existing air condition measurement apparatuses include a light-emitting unit that radiates light onto foreign substances and a light-receiving unit that receives reflection light reflected by the foreign substances, thereby measuring the concentrations of foreign substances in the air in an optical method. In the existing air condition measurement apparatus, foreign substances may adhere to the lens of the light-emitting unit and the lens of the light-receiving unit, thereby lowering the performance of the light-emitting unit and the light-receiving unit. A user must periodically (approximately every 2 to 3 months) remove the foreign substances attached to the lens of the light-emitting unit and the lens of the light-receiving unit using cleaning equipment, such as a swab, which may be inconvenient to the user. If the optical axes of the lenses are misaligned in the process of directly removing foreign substances attached to the lenses by the user, the reliability of foreign substances measurement may be degraded. Conventional air condition measurement apparatuses require an opening through which the cleaning equipment is inserted into a housing, which is not preferable in terms of design of the air condition measurement apparatus.

An air condition measurement apparatus and a method thereof according to various embodiments of the disclosure are intended to prevent foreign substances from adhering to the lens of a light-emitting unit and the lens of a light-receiving unit.

An air condition measurement apparatus and a method thereof according to various embodiments of the disclosure are intended to facilitate convenient removal of foreign substances from a housing.

An air condition measurement apparatus and a method thereof according to various embodiments of the disclosure are intended to provide better quality design of the air condition measurement apparatus by eliminating the need for an opening for insertion of cleaning equipment, as in a conventional air condition measurement apparatus.

Technical Solution

An air condition measurement apparatus according to various embodiments of the disclosure may include: a housing including a first space and a second space therein; a light-emitting unit positioned inside the housing, including a first lens, and configured to radiate light onto air introduced into the housing; a light-receiving unit positioned inside the housing, including a second lens, and configured to receive reflected light obtained by reflection of the light radiated from the light-emitting unit by foreign substances contained in the air; a blocking member through which the radiated light or the reflection light passes through and configured to separate the first space in which the light-emitting unit or the light-receiving unit is arranged from the second space; and a control unit, wherein the control unit is configured to measure air condition on the basis of a signal corresponding to the reflection light received by the light-receiving unit.

An air condition measurement method according to various embodiments of the disclosure may include: radiating light using a light-emitting unit positioned inside a housing so as to pass through a blocking member preventing foreign substances from adhering to a first lens of the light-emitting unit; receiving reflected light obtained by reflection of the radiated light from the light-emitting unit by foreign substances contained in the air inside the housing via the blocking member using a light-receiving unit positioned inside the housing; receiving a signal corresponding to the received reflection light from the light-receiving unit; and measuring a first value of air condition by comparing the signal received from the light-receiving unit with a predetermined value stored in a memory using a control unit.

An air condition measurement apparatus and a method thereof according to various embodiments of the disclosure use a blocking member that prevents the air introduced into the housing from flowing to the light-receiving unit and the light-emitting unit and prevents foreign substances from adhering to the light-emitting unit and the light-receiving unit, thereby improving the reliability of the foreign substance measurement.

An air condition measurement apparatus and a method thereof according to various embodiments of the disclosure do not require separate cleaning of the light-emitting unit and the light-receiving unit, thereby preventing misalignment of optical axes of the lenses of the light-receiving unit and the light-emitting unit in the process of cleaning the same, and do not require an opening of the housing for cleaning the light-receiving unit and the light-emitting unit, thereby providing better quality design of the air condition measurement apparatus.

An air condition measurement apparatus and a method thereof according to various embodiments of the disclosure may facilitate convenient removal of foreign substances inside the housing by controlling the rotational speed of a fan.

DETAILED DESCRIPTION

Figure 1:
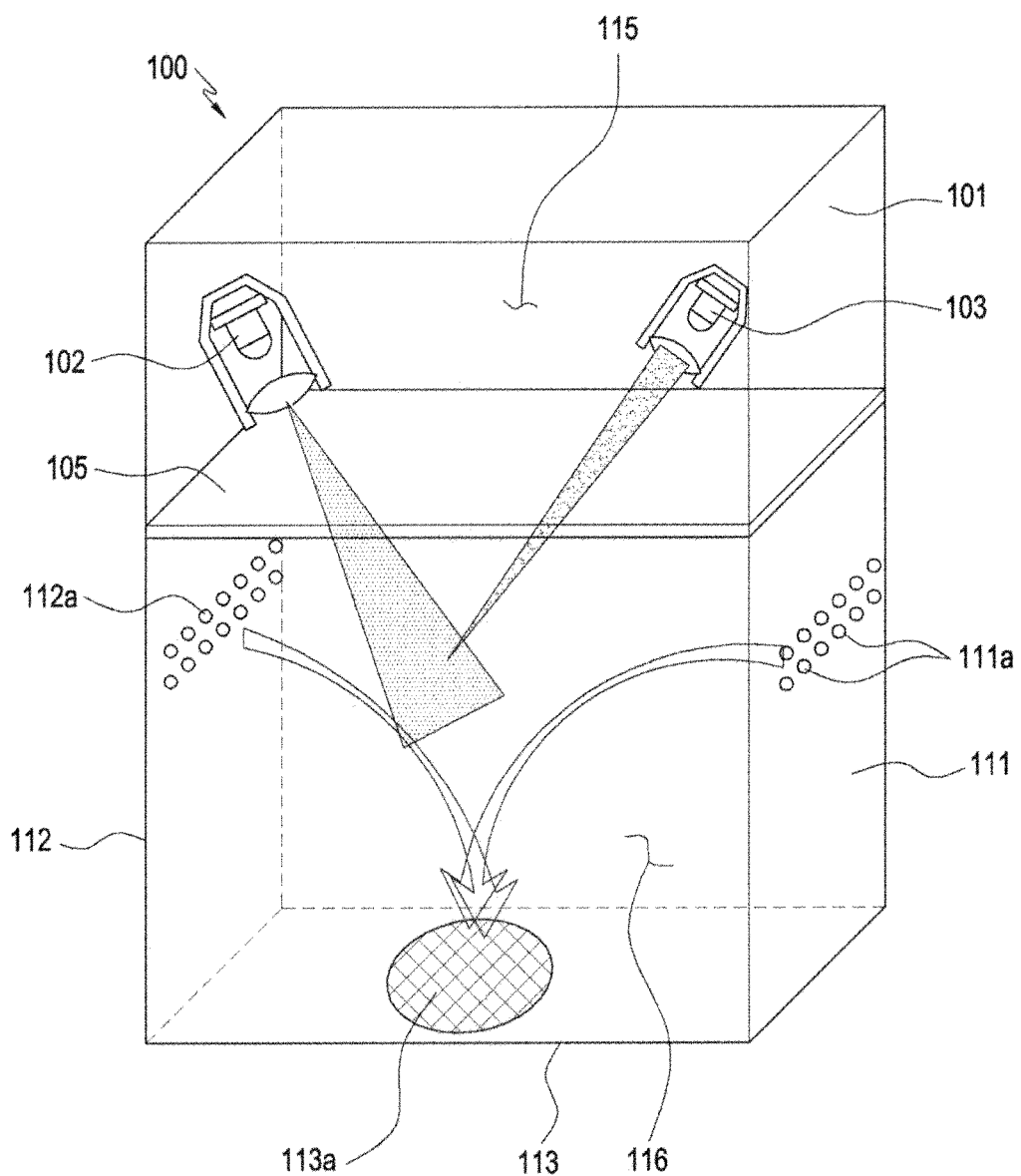
FIG. 1 is a perspective view illustrating the interior of an air condition measurement apparatus according to one of various embodiments of the disclosure.

Hereinafter, various embodiments of the disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, singular forms may include plural forms as well unless the context clearly indicates otherwise. The expression "a first", "a second", "the first", or "the second" may modify various components regardless of the order and/or the importance, and is used merely to distinguish one element from any other element without limiting the corresponding elements. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

Figure 2A:
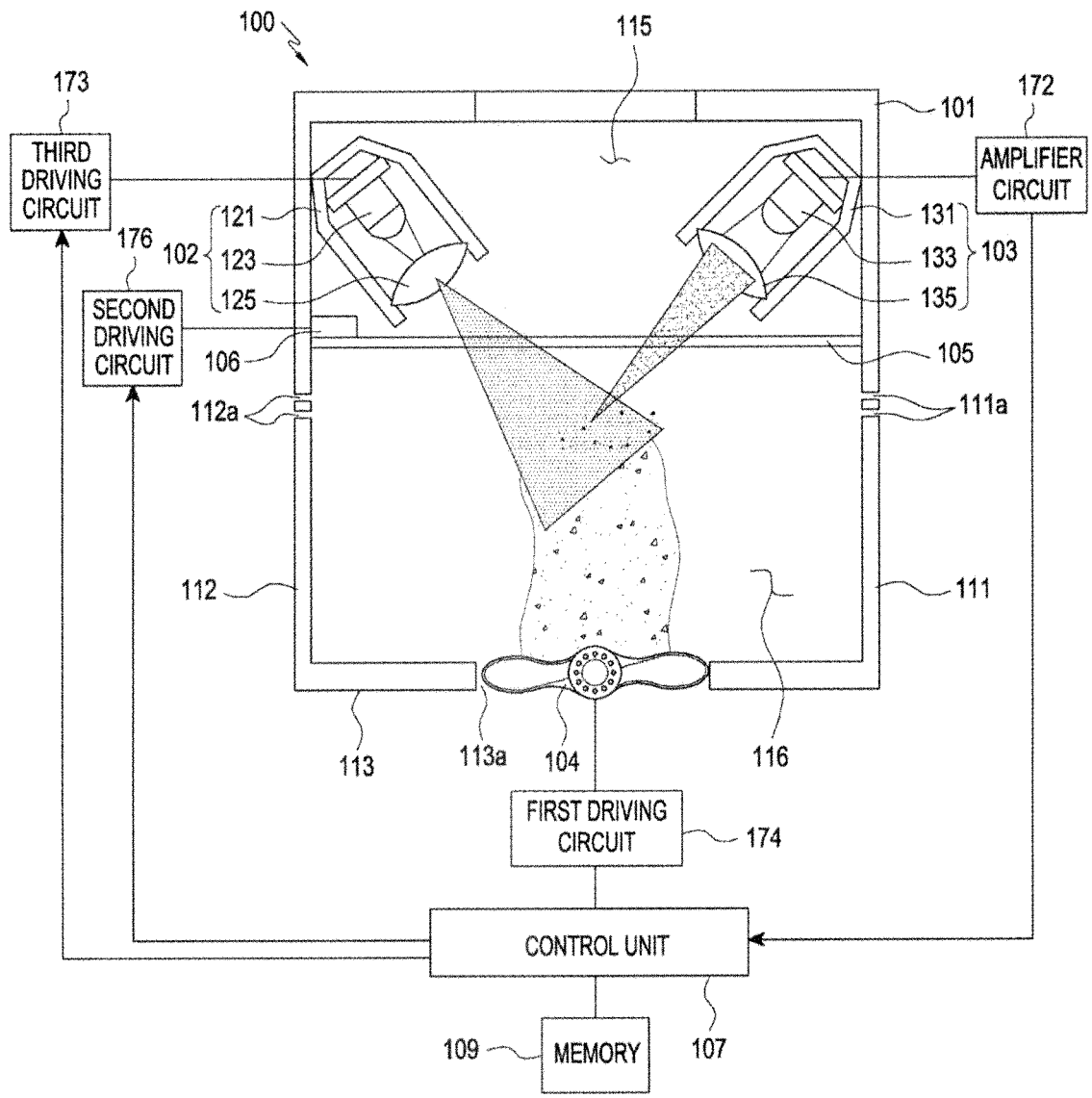
FIG. 2A is a side view illustrating the interior of an air condition measurement apparatus according to one of various embodiments of the disclosure.
Figure 2B:
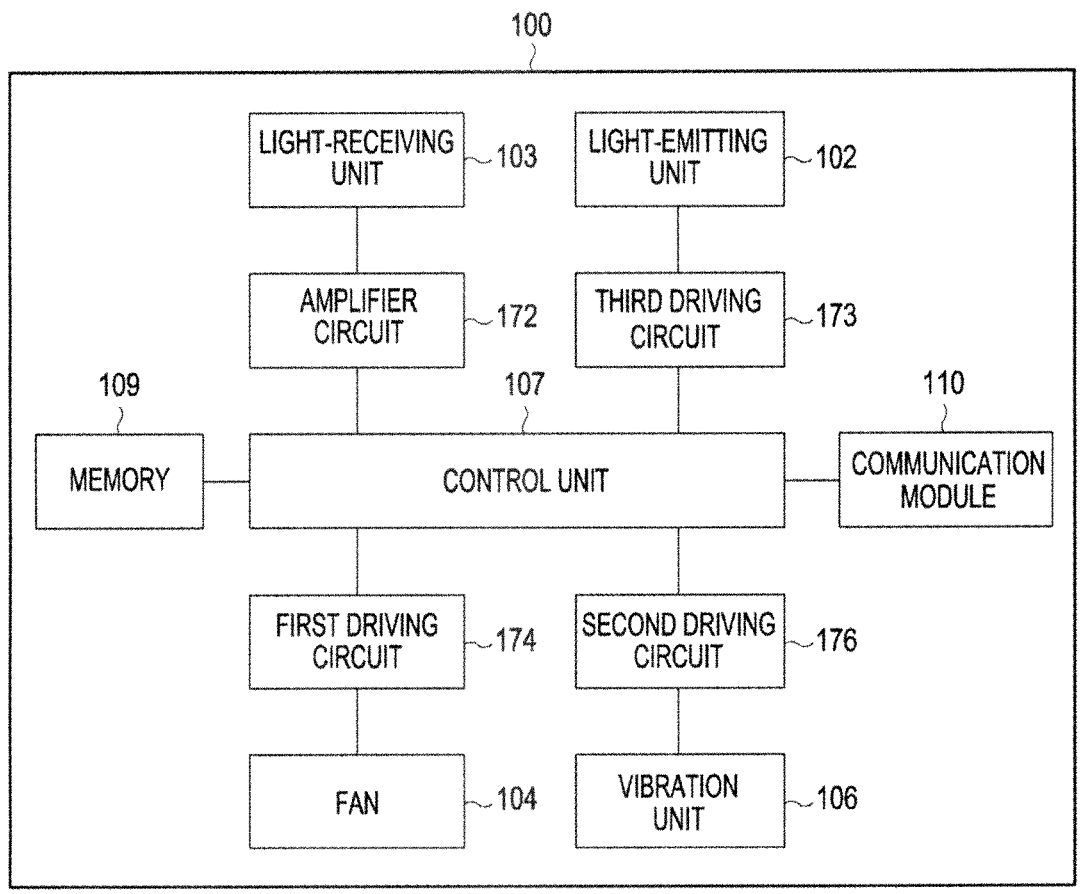
FIG. 2B is a block diagram of an air condition measurement apparatus according to one of various embodiments of the disclosure.

FIG. 1 is a perspective view illustrating the interior of an air condition measurement apparatus according to one of various embodiments of the disclosure. FIG. 2A is a side view illustrating the interior of an air condition measurement apparatus according to one of various embodiments of the disclosure. FIG. 2B is a block diagram of an air condition measurement apparatus according to one of various embodiments of the disclosure.

Referring to FIGS. 1 to 2B, an air condition measurement apparatus 100 according to one of various embodiments of the disclosure may include a housing 101, a light-emitting unit 102, a light-receiving unit 103, and a blocking member 105. The housing 101 may have an inner space, and may include a first side 111, a second side 112 facing the first side 111, and a lower side 113 connecting the first side 111 and the second side 112. The housing 101 may include air inlets 111a and 112a formed on the first and second sides 111 and 112 and an air outlet 113a formed on the lower side 113. The air inlets 111a and 112a may provide paths through which air is introduced from the outside of the housing 101 into the housing 101. The air outlet 113a may provide a path through which air is discharged from the inside of the housing 101 to the outside of the housing 101. According to various embodiments of the disclosure, the air inlets 111a and 112a may be paths through which the air inside the housing 101 is discharged, as well as paths through which the air is introduced from the outside of the housing 101 thereinto. According to various embodiments of the disclosure, the air outlet 113a may be a path through which the air is introduced from the outside of the housing 101 thereinto, as well as a path through which the air inside the housing 101 is discharged.

The light-emitting unit 102 may be positioned inside the housing 101. The light-emitting unit 102 may include a first body 121, a light-emitting part 123, and a first lens 125. The first body 121 may be coupled to the first side 111 of the housing 101 while accommodating the light-emitting part 123. According to various embodiments of the disclosure, the first body 121 may be positioned inside the housing 101 using separate equipment, as well as being coupled to the first side 111. The light-emitting part 123 may be an LED. According to various embodiments of the disclosure, the light-emitting part 123 may be any of various lighting devices capable of emitting light, as well as the LED. The first lens 125 may mounted on the first body 121 so as to refract light radiated from the light-emitting part 123. The first lens 125 may be made of glass or a transparent resin. According to various embodiments of the disclosure, the air condition measurement apparatus 100 may radiate light onto the inside of the housing 101 using natural light, as well as the light-emitting unit 102.

The light-receiving unit 103 may be positioned inside the housing 101. The light-receiving unit 103 may include a second body 131, a light-receiving sensor 133, and a second lens 135. The second body 131 may be coupled to the second side 112 of the housing 101 while accommodating the light-receiving sensor 133. According to various embodiments of the disclosure, the second body 131 may be positioned inside the housing 101 using separate equipment, as well as being coupled to the second side 112. The light-receiving sensor 133 may receive light inside the housing 101, and may convert the received light into signal. The second lens 135 may be mounted on the second body 131 so as to refract the light inside the housing 101 toward the light-receiving sensor 133. The second lens 135 may be made of glass or a transparent resin.

The blocking member 105 may be arranged between the light-receiving unit 103 and the air inlets 111a and 112a. The blocking member 105 may be configured in the form of a plate, and may be coupled to the inner surface of the housing 101. The blocking member 105 may divide the inner space of the housing 101 into a first space 115 and a second space 116. The light-emitting unit 102 and the light-receiving unit 103 may be arranged in the first space 115. Air may be introduced into the second space 116 through the air inlets 111a and 112a. For example, the air in the second space 116 may contain foreign substances. The foreign substances may encompass all kinds of impurities contained in the air, such as dust or smoke. The blocking member 105 may be made of a transparent material. For example, the blocking member 105 may be made of glass or a transparent resin. Since the blocking member 105 is made of a transparent material, light emitted from the light-emitting unit 102, which is positioned in the first space 115, may pass through the blocking member 105 to reach the foreign substances in the second space 116, and may then be converted to reflection light by the foreign substances. The light-receiving unit 103 arranged in the second space 115 may receive reflection light reflected by the foreign substances in the second space 116 via the transparent blocking member 105. According to various embodiments of the disclosure, the blocking member may be made of an opaque and light-transmitting material, as well as a transparent material.

The air condition measurement apparatus according to various embodiments of the disclosure may include a fan 104 that makes an air flow inside the housing 101.

The fan 104 may be positioned at the air outlet 113a. However, the fan 104 may be arranged at the lower side of the housing 101, instead of the air outlet 113a. The fan 104 may discharge the air inside the housing 101 to the outside thereof, thereby inducing air to flow into the housing 101 through the air inlets 111a and 112a. For example, the fan 104 may make an air flow between the air inlets 111a and 112a and the air outlet 113a.

The air condition measurement apparatus according to various embodiments of the disclosure may further include a vibration unit 106 arranged on one side of the blocking member 105.

The vibration unit 106 may generate vibration using signal. The vibration unit 106 may include a piezoelectric element. As the vibration unit 106 vibrates, the foreign substances attached to one side of the blocking member 105 may be removed.

The air condition measurement apparatus 100 according to one of various embodiments of the disclosure may further include a control unit 107, a light-emitting unit 102, a light-receiving unit 103, and a fan 104.

The control unit 107 may be configured to measure air condition inside the housing 101 (FIG. 1) on the basis of a signal received from the light-receiving unit 103.

The light-emitting unit 102 may be electrically connected to the control unit 107. The control unit 107 may control the emission of light by the light-emitting unit 102. A third driving circuit 173 may be disposed between the light-emitting unit 102 and the control unit 107. The third driving circuit 173 may receive signal by the control unit 107, and may then drive the light-emitting unit 102.

The light-receiving unit 103 may be electrically connected to the control unit 107 through an amplifier circuit 172. The amplifier circuit 172 may amplify a signal received from the light-receiving unit 103, and may then transmit the amplified signal to the control unit 107. According to various embodiments of the disclosure, the light-receiving unit 103 may be directly connected to the control unit 107 without passing through the amplifier circuit 172.

The fan 104 may be electrically connected to the control unit 107 through the first driving circuit 174. The control unit 107 may control the rotational speed of the fan 104. According to various embodiments of the disclosure, the fan 104 may be directly connected to the control unit 107 without passing through the first driving circuit 174.

The vibration unit 106 may be electrically connected to the control unit 107 through the second driving circuit 176. The control unit 107 may transmit a signal to the vibration unit 106, thereby controlling the driving of the vibration unit. According to various embodiments of the disclosure, the vibration unit 106 may be directly connected to the control unit 107 without passing through the second driving circuit 176.

The air condition measurement apparatus 100 according to various embodiments of the disclosure may include a memory 109.

The memory 109 may store a second value that is a comparative value for comparison of air condition. The control unit 107 may compare a first value of air condition corresponding to the light received by the light-receiving unit 103 with the second value. The control unit 107 may control the rotational speed of the fan 104 on the basis of the difference between the first value and the second value.

The air condition measurement apparatus 100 according to various embodiments of the disclosure may include a communication module 110.

The communication module 110 may transmit and receive a radio signal to and from an external server or an external electronic device, thereby receiving a third value of the outdoor air condition. The control unit 107 may compare the first value with the third value. The control unit 107 may control the rotational speed of the fan 104 on the basis of the difference between the first value and the third value.

According to various embodiments of the disclosure, the communication module 110 may receive specified information (e.g., instructions) from an external server or an external electronic device. The control unit 107 may be configured to control the vibration unit 106 so as to generate vibration upon receiving the specified information through the communication module 110. For example, the control unit 107 may allow the vibration unit 106 to generate vibration on the basis of the specified information (e.g., instructions), thereby removing foreign substances (e.g., dust) attached to the blocking member 105.

Figure 3A:
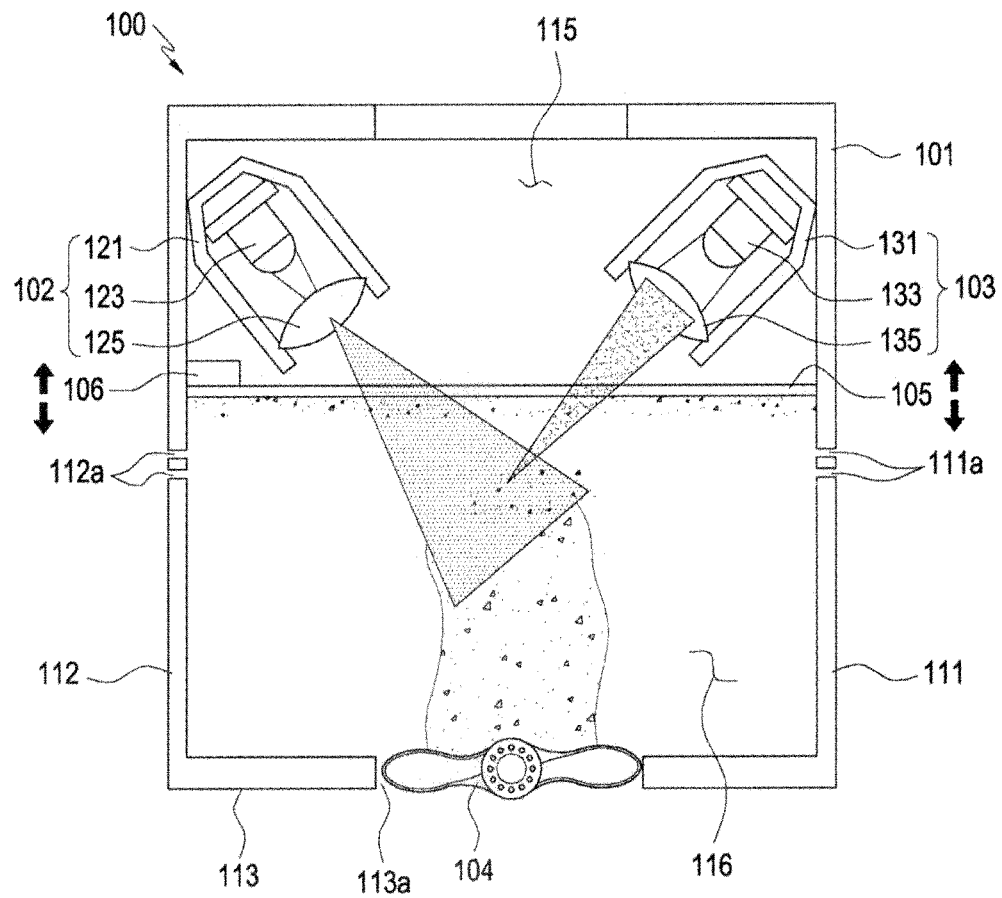
FIG. 3A is a side view illustrating the operation of a vibration unit of an air condition measurement apparatus according to one of various embodiments of the disclosure.
Figure 3B:
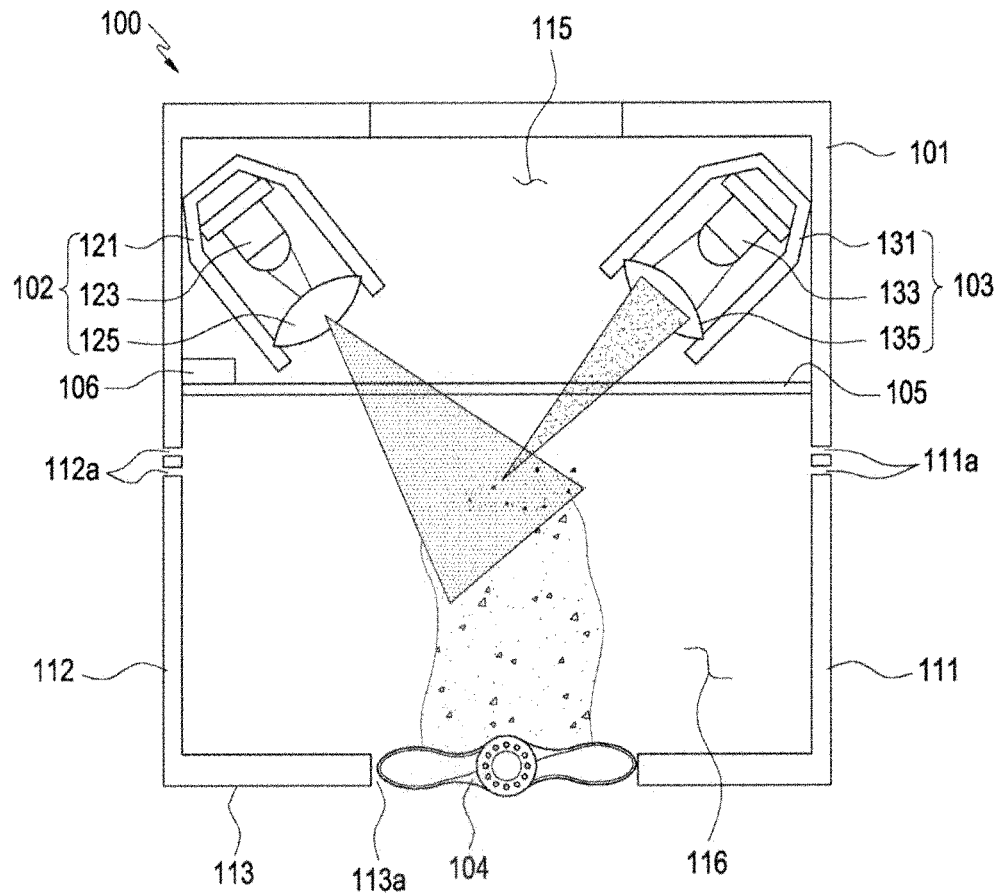
FIG. 3B is a side view illustrating the state in which foreign substances are removed from a blocking member by driving a vibration unit of an air condition measurement apparatus according to one of various embodiments of the disclosure.

FIG. 3A is a side view showing the state in which a vibration unit of an air condition measurement apparatus is driven according to one of various embodiments of the disclosure. FIG. 3B is a side view showing the state in which foreign substances are removed from a blocking member by driving a vibration unit of an air condition measurement apparatus according to one of various embodiments of the disclosure.

Referring to FIGS. 3A and 3B, the vibration unit 106 may receive a signal from the control unit 107 (FIG. 2A), and may convert the signal into vibration energy. As the vibration unit 106 vibrates, the blocking member 105 coupled to the vibration unit 106 may be vibrated. As the blocking member 105 is vibrated, foreign substances attached to one side of the blocking member 105 may be removed. Since the air condition measurement apparatus 100 is able to remove foreign substances attached to the blocking member 105 using the vibration unit 106, it is possible to prevent generation of noise in the light emitted from the emitting unit 102 and the reflection light received by the light-receiving unit 103 due to the foreign substances attached to the blocking member 105.

Figure 4:
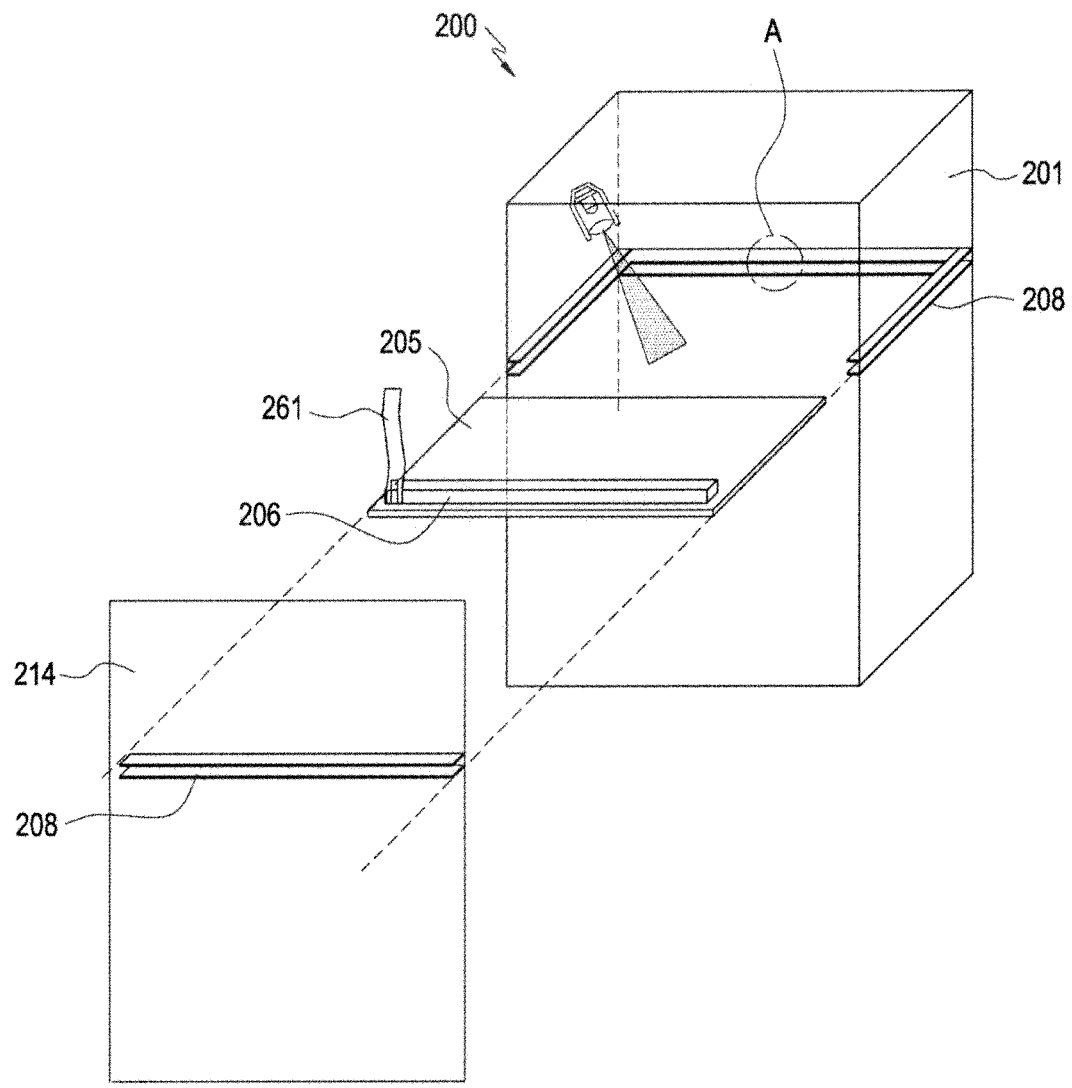
FIG. 4 is an exploded perspective view illustrating an air condition measurement apparatus according to another of various embodiments of the disclosure.
Figure 5:
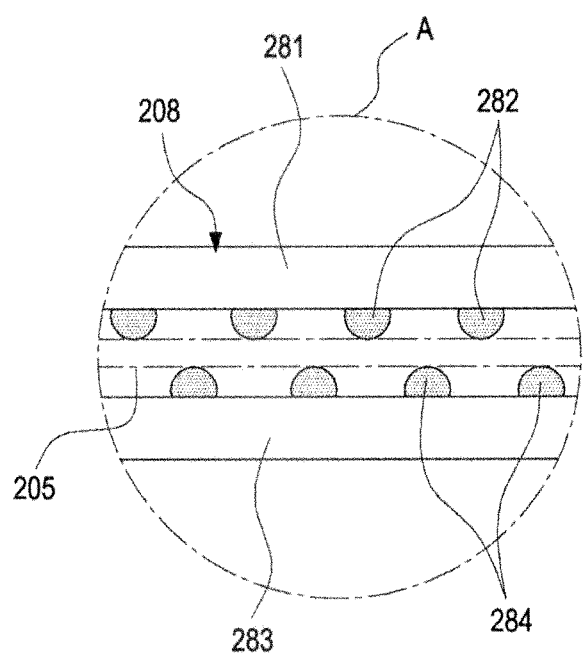
FIG. 5 is an enlarged view of A shown in FIG. 4.

FIG. 4 is an exploded perspective view illustrating an air condition measurement apparatus according to another of various embodiments of the disclosure. FIG. 5 is an enlarged view of A shown in FIG. 4.

Referring to FIGS. 4 and 5, an air condition measurement apparatus 200 according to another of various embodiments of the disclosure may include a housing 201, a blocking member 205, a vibration unit 206, and support members 208 for supporting the blocking member 205.

The support members 208 may be coupled to the inner surface of the housing 201. The support members 208 may include a first support member 281, a second support member 283, and buffer members 282 and 284. The second support member 283 may be spaced apart from the first support member 281 so as to support the blocking member 205. The buffer members 282 and 284 may be arranged on one side of the first support member 281 or on one side of the second support member 283. One side of the second support member 283 may face one side the first support member 281. The buffer members 282 and 284 may be made of an elastic material. For example, the buffer members 282 and 284 may be made of rubber. The buffer members 282 and 284 may be configured in the form of a sponge. The buffer members 282 and 284 may include a first buffer member 282 and a second buffer member 284. The first buffer member 282 may be attached to one side of the first support member 281, and may have a round shape. The second buffer member 284 may be attached to one side of the second support member 283, and may have a round shape. The first buffer member 282 may be arranged so as to avoid facing the second buffer member 284. The blocking member 205 may be inserted between the first buffer member 282 and the second buffer member 284 so that the blocking member 205 may be pressed by the first and second buffer members 284. According to various embodiments of the disclosure, the first buffer member 282 may be arranged so as to face the second buffer member 284, as well as being arranged so as not to face the second buffer member 284.

The vibration unit 206 may be arranged along the edge of the blocking member 205. The vibration unit 206 may have a longitudinal direction. The vibration unit 206 may be electrically connected to the control unit 107 (FIG. 3) through a connection circuit 261.

If the vibration unit 206 vibrates the blocking member 205, the buffer members 282 may absorb the vibration, thereby preventing the vibration from being transmitted to the support members 208 or to the housing 201 through the support members 208.

Figure 6:
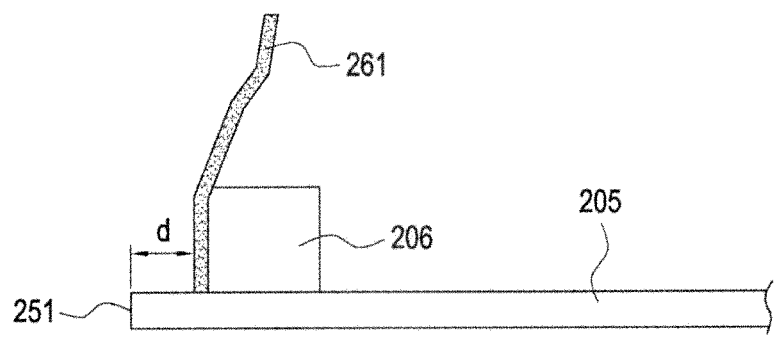
FIG. 6 is a side view illustrating a blocking member and a vibration unit of an air condition measurement apparatus according to another of various embodiments of the disclosure.

FIG. 6 is a side view showing a blocking member and a vibration unit of an air condition measurement apparatus according to another of various embodiments of the disclosure.

Referring to FIG. 6, the vibration unit 206 of an air condition measurement apparatus according to another of various embodiments of the disclosure may be arranged to be spaced apart from one end 251 of a blocking member 205.

A connection circuit 261 may be attached to one side of the vibration unit 206. The connection circuit 261 attached to one side of the vibration unit 261 may be spaced a first distance (d) apart from the one end 251 of the blocking member 205. Since the vibration unit 206 is spaced apart from the one end 251 of the blocking member 205, it is possible to prevent the contact between the vibration unit 206 and the inner surface of the housing 201 (FIG. 4) in the state in which the blocking member 205 is coupled to the housing 201 (FIG. 4). Since the vibration unit 206 is not in contact with the inner surface of the housing 201 (FIG. 4), the vibration may not be directly transferred from the vibration unit 206 to the housing 201 (FIG. 4), thereby preventing generation of noise due to the vibration from the vibration unit 206.

Figure 7:
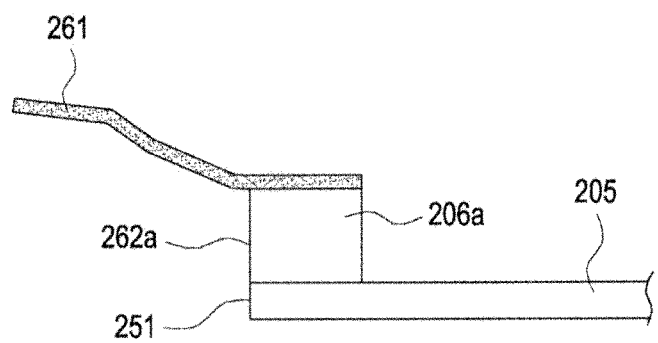
FIG. 7 is a side view illustrating a blocking member and a vibration unit of an air condition measurement apparatus according to another of various embodiments of the disclosure.

FIG. 7 is a side view showing a blocking member and a vibration unit of an air condition measurement apparatus according to another of various embodiments of the disclosure.

Referring to FIG. 7, a vibration unit 206*a* of an air condition measurement apparatus according to another of various embodiments of the disclosure may be arranged adjacent to one end 251 of a blocking member 205. For example, one side 262*a* of the vibration unit 206*a* may be parallel with one end 251 of the blocking member 205. A connection circuit 261 may be attached to the upper surface of the vibration unit 206*a*.

Figure 8:
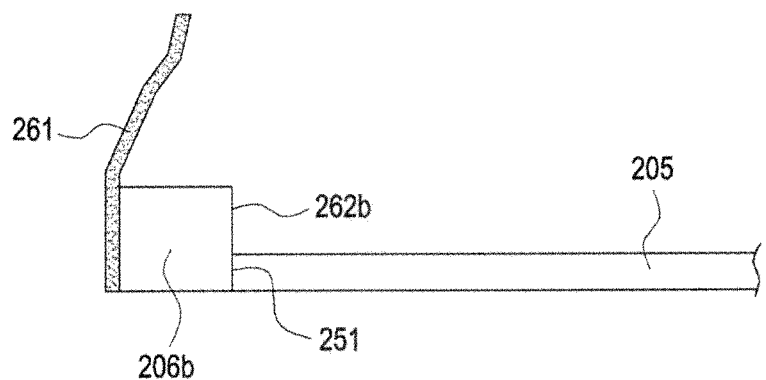
FIG. 8 is a side view illustrating a blocking member and a vibration unit of an air condition measurement apparatus according to another of various embodiments of the disclosure.

FIG. 8 is a side view showing a blocking member and a vibration unit of an air condition measurement apparatus according to another of various embodiments of the disclosure.

Referring to FIG. 8, a vibration unit 206*b* of an air condition measurement apparatus according to another of various embodiments of the disclosure may be attached to one end 251 of a blocking member 205. For example, one side 262*b* of the vibration unit 206*b* may be attached to one end 251 of the blocking member 205. A connection circuit 261 may be attached to the other side opposite the one side 262*b* of the vibration unit 206*b*.

Figure 9:
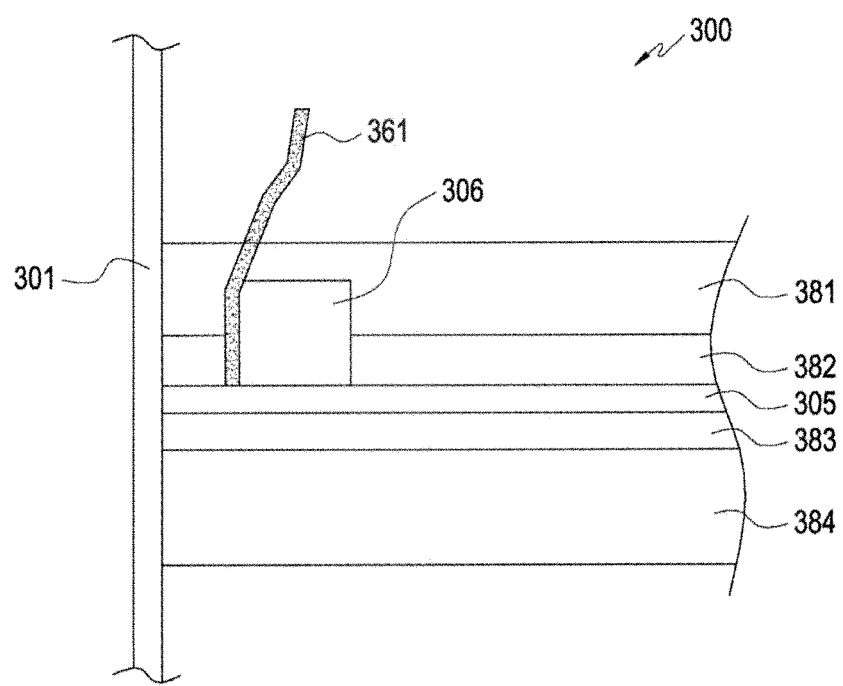
FIG. 9 is a side view illustrating the state in which a blocking member and a vibration unit of an air condition measurement apparatus are mounted according to another of various embodiments of the disclosure.

FIG. 9 is a side view showing the state in which a blocking member and a vibration unit of an air condition measurement apparatus are mounted according to another of various embodiments of the disclosure.

Referring to FIG. 9, an air condition measurement apparatus 300 according to another of various embodiments of the disclosure may include support members, a blocking member 305, and a vibration unit 306.

The support members may include a first support member 381, a second support member 384, a first buffer member 382, and a second buffer member 383, and a detailed description of the elements the same as or similar to those in the above embodiments will be omitted.

The first buffer member 382 may be disposed to face the second buffer member 383. The blocking member 305 may be arranged between the first buffer member 382 and the second buffer member 383. The vibration unit 306 may be arranged on one side of the blocking member 305. A connection circuit 361 may be attached to one side of the vibration unit 306. The first support member 381 may have a space for receiving a portion of the vibration unit 306. The first buffer member 382 may have a space, which is connected to the space of the first support member 381, for receiving the vibration unit 306. The vibration unit 306 may be arranged on the blocking member 305 while being surrounded by the first support member 381 and the first buffer member 382. The first support member 381 may have an opening through which the connection circuit 361 passes.

Figure 10A:
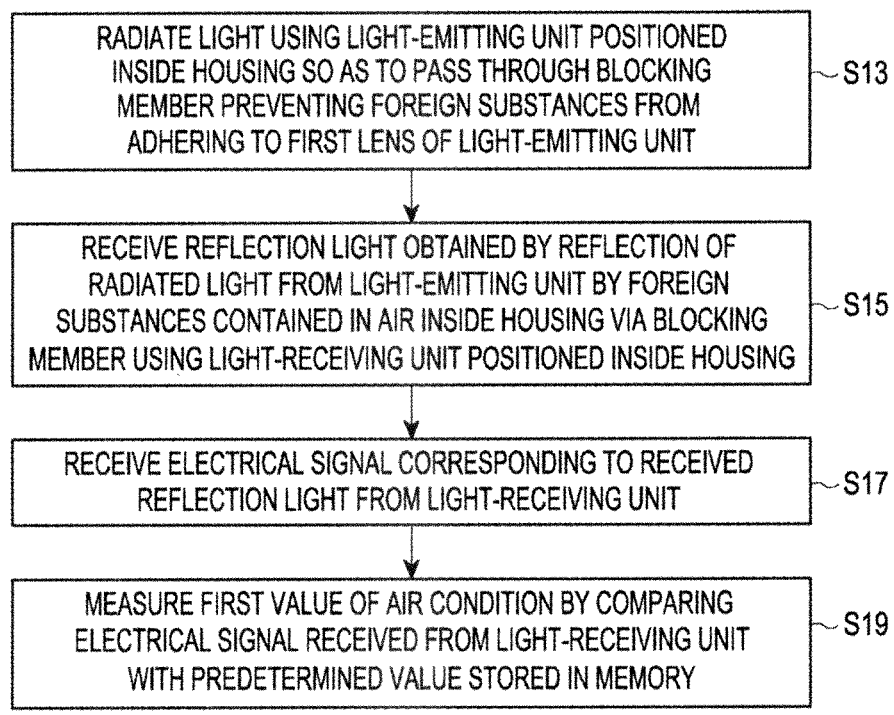
FIG. 10A is a flowchart illustrating an air condition measurement method according to one of various embodiments of the disclosure.

FIG. 10A is a flowchart illustrating an air condition measurement method according to one of various embodiments of the disclosure.

Referring to FIG. 10A, an air condition measurement method according to one of various embodiments of the disclosure may include: an operation of radiating light using a light-emitting unit positioned inside the housing so as to pass through a blocking member, which is made of a transparent material and prevents foreign substances from adhering to a first lens of the light-emitting unit (S13); an operation of receiving reflection light obtained by reflection of the light radiated from the light-emitting unit by the foreign substances contained in the air inside the housing via the blocking member using a light-receiving unit positioned inside the housing (S15); an operation of receiving a signal corresponding to the received reflection light from the light-receiving unit (S17); and an operation of measuring a first value of air condition by comparing the electrical signal received from the light-receiving unit with a predetermined value stored in a memory using a control unit (S19).

Figure 10B:
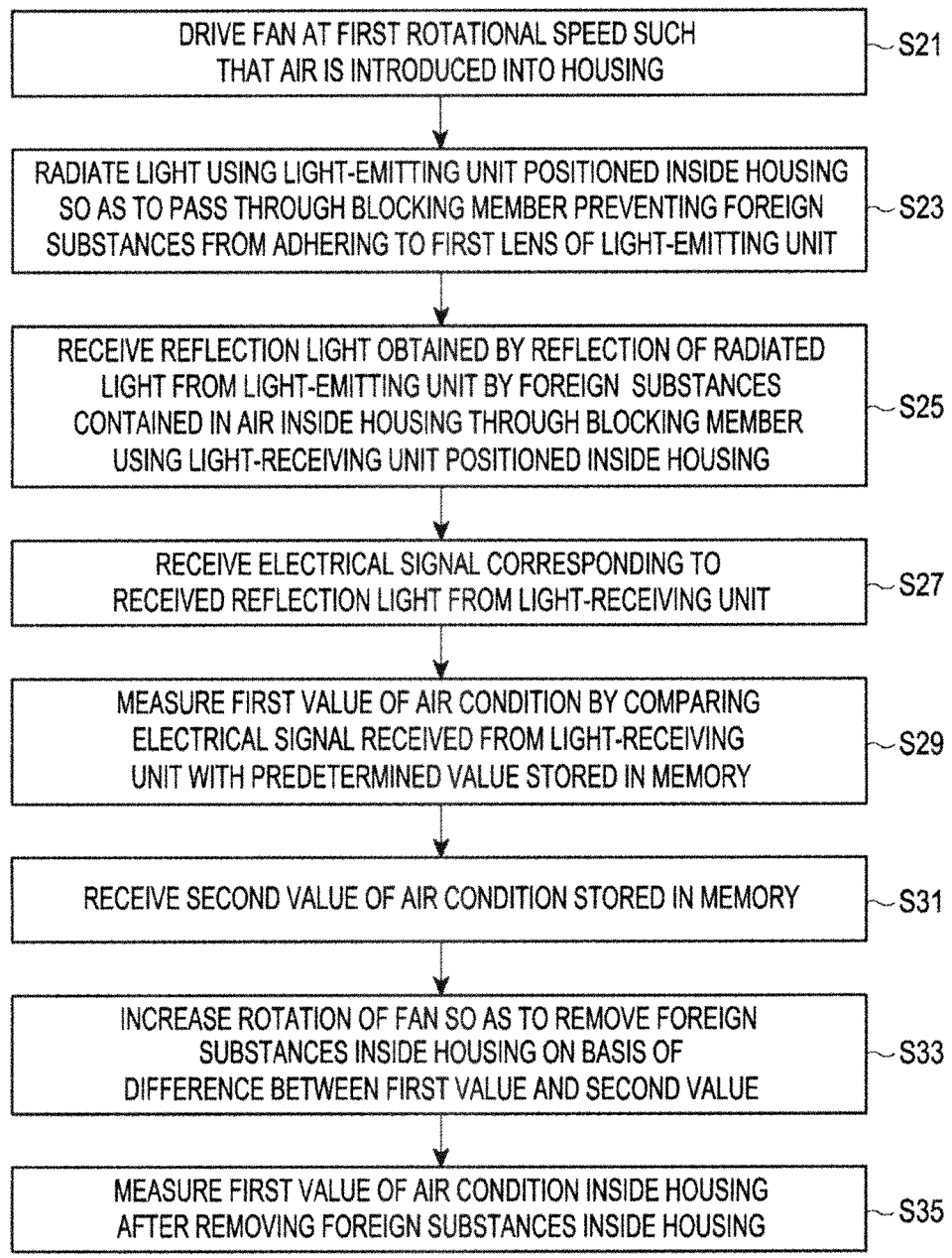
FIG. 10B is a flowchart illustrating an air condition measurement method according to another of various embodiments of the disclosure.

FIG. 10B is a flowchart illustrating an air condition measurement method according to one of various embodiments of the disclosure.

Referring to FIG. 10B, an air condition measurement method according to one of various embodiments of the disclosure may include: an operation of driving a fan at a first rotational speed such that air is introduced into a housing (S21); an operation of radiating light using a light-emitting unit positioned inside the housing so as to pass through a blocking member, which is made of a transparent material and prevents foreign substances from adhering to a first lens of the light-emitting unit (S23); an operation of receiving reflection light by reflection of the light radiated from the light-emitting unit by the foreign substances contained in the air inside the housing via the blocking member using a light-receiving unit positioned inside the housing (S25); an operation of receiving, from the light-receiving unit, a signal corresponding to the received reflection light (S27); and an operation of measuring a first value of air condition by comparing the signal received from the light-receiving unit with a predetermined value stored in a memory using a control unit (S29); an operation of receiving a second value of air condition stored in the memory (S31); an operation of increasing the rotation of the fan so as to remove the foreign substances inside the housing on the basis of the difference between the first value and the second value (S33); and an operation of measuring a first value of air condition inside the housing after removing the foreign substances inside the housing (S35).

In the operation of driving the fan at a first rotational speed such that air is introduced into the housing (S21), the control unit 107 (FIG. 2A) supplied with power may drive the fan at the first rotational speed so that air may be introduced into the housing.

In operation of receiving the second value of air condition stored in the memory (S31), the control unit 107 (FIG. 2A) may receive the second value of air condition stored in the memory. The second value may be a reference value for removing foreign substances inside the housing.

In the operation of increasing the rotation of the fan so as to remove the foreign substances inside the housing on the basis of the difference between the first value and the second value (S33), the control unit 107 (FIG. 2A) may compare the first value with the second value, and may then perform control so as to increase the rotation of the fan on the basis of the difference between the first value and the second value. For example, if there is a difference between the first value and the second value, the control unit 107 (FIG. 2A) may control the fan so as to be driven at a second rotational speed greater than the first rotational speed, thereby removing the foreign substances inside the housing.

In the operation of measuring a first value of air condition inside the housing after removing the foreign substances inside the housing (S35), the control unit 107 (FIG. 2A) may perform control such that the fan rotates at the first rotational speed.

Figure 10C:
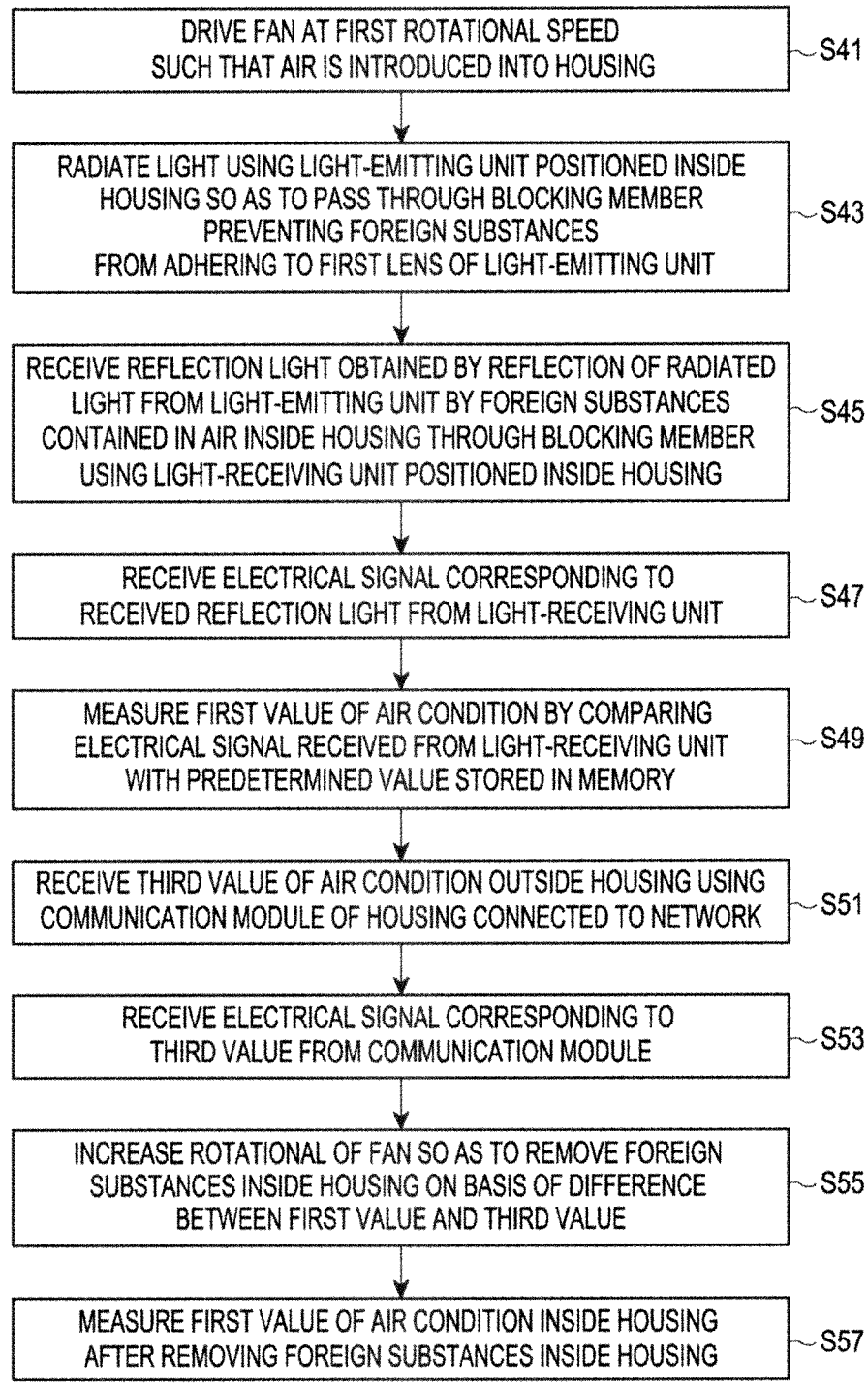
FIG. 10C is a flowchart illustrating an air condition measurement method according to another of various embodiments of the disclosure.
Figure 11:
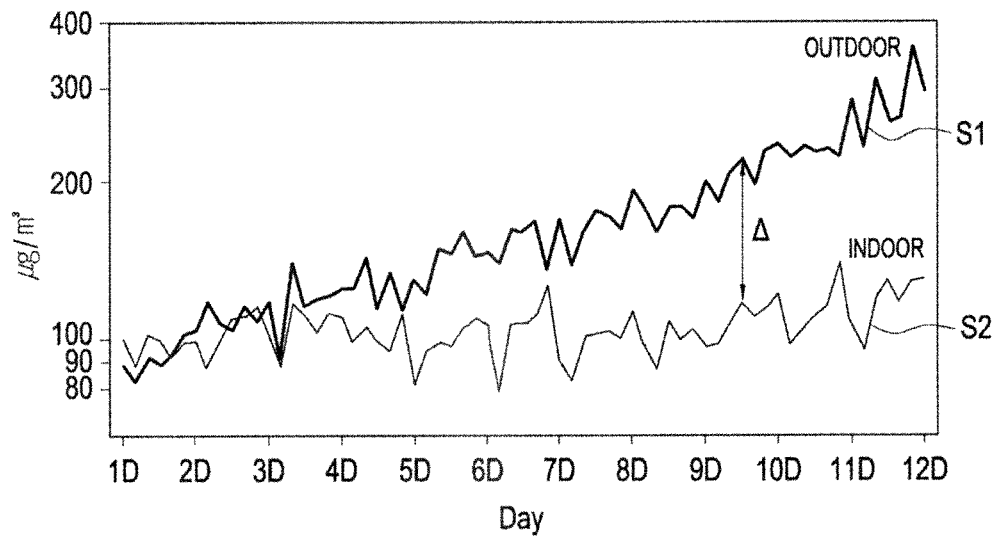
FIG. 11 is a graph illustrating a first value of air condition of an air condition measurement apparatus and a third value of air condition received using wireless communication according to various embodiments of the disclosure.

FIG. 10C is a flowchart illustrating an air condition measurement method according to another of various embodiments of the disclosure. FIG. 11 is a graph illustrating a first value of air condition of an air condition measurement apparatus and a third value of air condition received using wireless communication according to various embodiments of the disclosure.

Referring to FIGS. 10C and 11, an air condition measurement method according to another of various embodiments of the disclosure may include: an operation of driving a fan at a first rotational speed such that air is introduced into a housing (S41); an operation of radiating light using a light-emitting unit positioned inside the housing so as to pass through a blocking member, which is made of a transparent material and prevents foreign substances from adhering to a first lens of the light-emitting unit (S43); an operation of receiving reflection light obtained by reflection of the light radiated from the light-emitting unit by the foreign substances contained in the air inside the housing via the blocking member using a light-receiving unit positioned inside the housing (S45); an operation of receiving, from the light-receiving unit, a signal corresponding to the received reflection light (S47); and an operation of measuring a first value of air condition by comparing the signal received from the light-receiving unit with a predetermined value stored in a memory using a control unit (S49); an operation of receiving a third value of air condition outside the housing using a communication module of the housing, which is connected to a network (S51); an operation of receiving a signal corresponding to the third value from the communication module (S53); an operation of increasing the rotation of the fan so as to remove the foreign substances inside the housing on the basis of the difference between the first value and the third value (S55); and an operation of measuring a first value of air condition inside the housing after removing the foreign substances inside the housing (S57).

In the operation of driving the fan at a first rotational speed such that air is introduced into the housing (S41), the control unit 107 (FIG. 2A) supplied with power may drive the fan at the first rotational speed so that air may be introduced into the housing.

In the operation of receiving a third value of air condition outside the housing using a communication module of the housing, which is connected to a network (S51), a third value (S1) of air condition outside the housing may be received using a communication module connected to a network (e.g., an external server). For example, the air condition measurement apparatus may be provided indoors, and the third value (S1) may indicate the foreign substance concentration of the outdoor air condition.

In the operation of receiving a signal corresponding to the third value from the communication module (S53), the control unit 107 (FIG. 2A) may receive a signal from the communication module, thereby recognizing the foreign substance concentration of the outdoor air condition.

In the operation of increasing the rotation of the fan so as to remove the foreign substances inside the housing on the basis of the difference between the first value (S2) and the third value (S1) (S55), the control unit 107 (FIG. 2A) may compare the first value (S2) with the third value (S1), and may then perform control so as to increase the rotation of the fan on the basis of the difference between the first value (S2) and the third value (S1). For example, if there is a difference (A) between the first value (S2) and the third value (S1), the control unit 107 (FIG. 2A) may control the fan so as to be driven at a second rotational speed greater than the first rotational speed, thereby removing the foreign substances inside the housing. The difference (A) between the first value (S2) and the third value (S1) may be configured by the control unit according to the size of a housing of the air condition measurement apparatus, the performance of a light-receiving unit, and the like. Since the foreign substances inside the housing are removed, the amount of reflection light received by the light-receiving unit due to the foreign substances inside the housing is reduced, thereby preventing deterioration of the reliability of the first value.

According to various embodiments of the disclosure, the air condition measurement method may further include an operation of driving the fan at a second rotational speed greater than the first rotational speed every predetermined time. The predetermined time may be variously configured by the control unit.

According to various embodiments of the disclosure, the air condition measuring method may further include an operation of generating vibration through a vibration unit arranged on one side of the blocking member. The operation of generating vibration through the vibration unit may be performed on the basis of the difference between the first value (S2) and the third value (S1). According to various embodiments of the disclosure, the operation of generating vibration through the vibration unit may be performed on the basis of the difference between the first value and the second value of air condition stored in the memory. According to various embodiments of the disclosure, the operation of generating vibration through the vibration unit may be performed on the basis of a predetermined time. According to various embodiments of the disclosure, the operation of generating vibration through the vibration unit may be performed on the basis of specified information (e.g., instructions) received from an external server or an external electronic device. The operation of generating vibration through the vibration unit may remove foreign substances (e.g. dust) attached to the blocking member.

Figure 12:
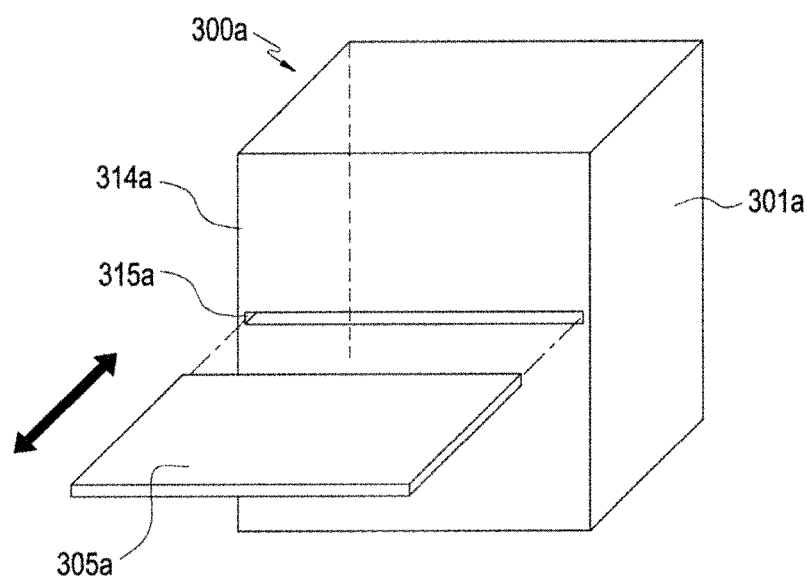
FIG. 12 is a perspective view illustrating an air condition measurement apparatus according to another of various embodiments of the disclosure.

FIG. 12 is a perspective view showing an air condition measurement apparatus according to another of various embodiments of the disclosure.

Referring to FIG. 12, an air condition measurement apparatus 300a according to another of various embodiments of the disclosure may include a housing 301a and a blocking member 305a, and a description of the elements the same as or similar to those in the above embodiments will be omitted.

The housing 301a may include one side 314a, which has an opening 315a through which the blocking member 305a is inserted and taken out. For example, the opening 315a may have a size corresponding to one end of the blocking member 305a.

The blocking member 305a may be inserted into the housing 301a through the opening 315a, or may be taken out of the housing 301a therethrough. The user may take out the blocking member 305a from the housing 301a, and may remove foreign substances attached to the blocking member 305a. After the foreign substances of the blocking member 305a are removed, the blocking member 305a may be inserted into the housing 301a through the opening 315a.

Figure 13:
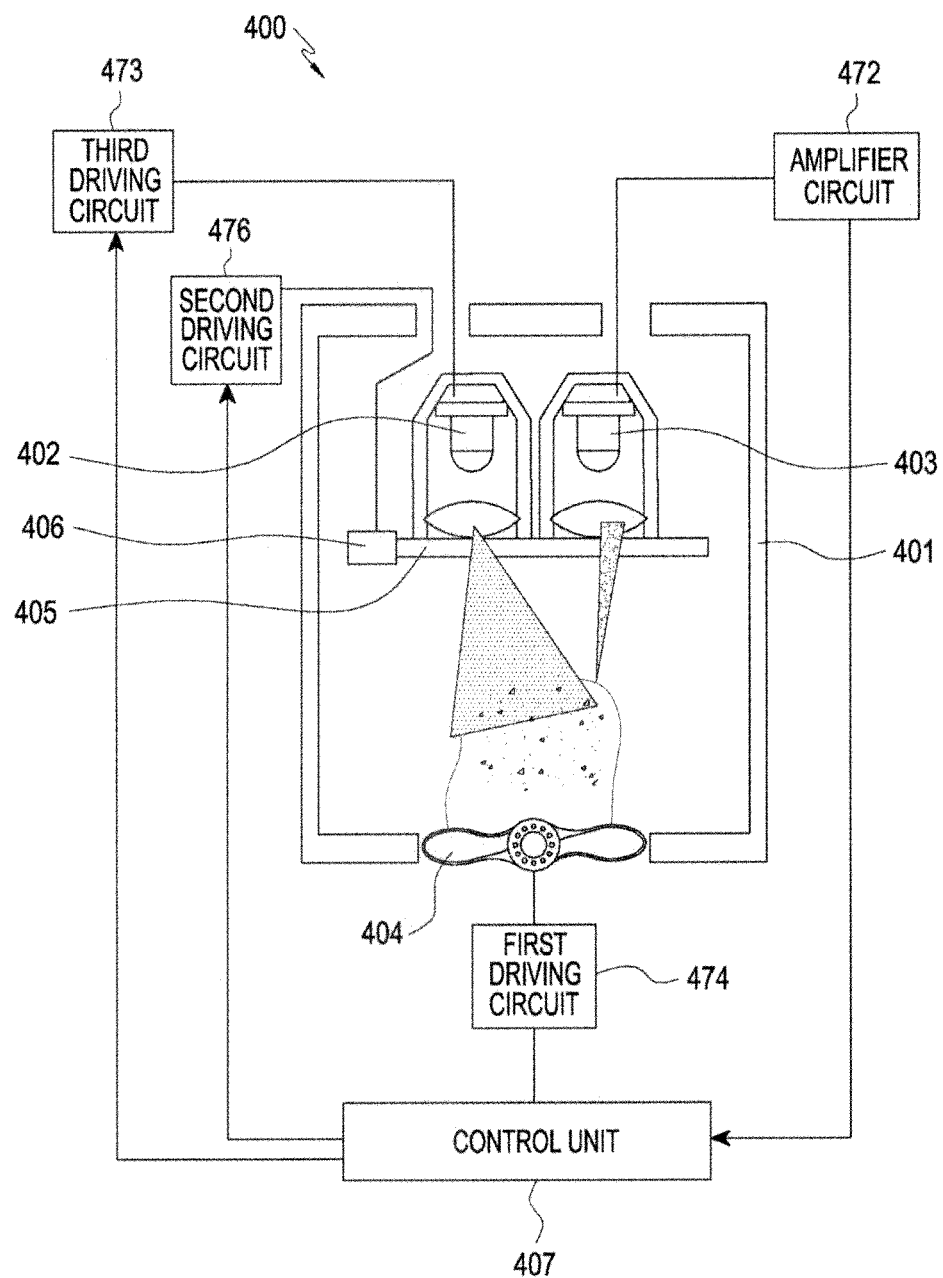
FIG. 13 is a view illustrating the interior of an air condition measurement apparatus according to another of various embodiments of the disclosure.

FIG. 13 is a view showing the interior of an air condition measurement apparatus according to another of various embodiments of the disclosure.

Referring to FIG. 13, an air condition measurement apparatus 400 according to another of various embodiments of the disclosure may include a housing 401, a light-emitting unit 402, a light-receiving unit 403, a fan 404, a blocking member 405, a vibration unit 406, a control unit 407, a third driving circuit 473, an amplifier circuit 472, a first driving circuit 474, and a second driving circuit 476.

The light-emitting unit 402 and the light-receiving unit 403 may be arranged side by side on the blocking member 405. The blocking member 405 may prevent foreign substances from adhering to the lens of the light-emitting unit 402 and the lens of the light-receiving unit 403.

According to various embodiments of the disclosure, the light-receiving unit 403 may be disposed to face the fan 404. If the light-receiving unit 403 receives reflection light reflected by foreign substance, the control unit 407 may stop driving the fan 404, thereby preventing generation of light noise of the light-receiving unit 403 due to the rotation of the fan.

Figure 14:
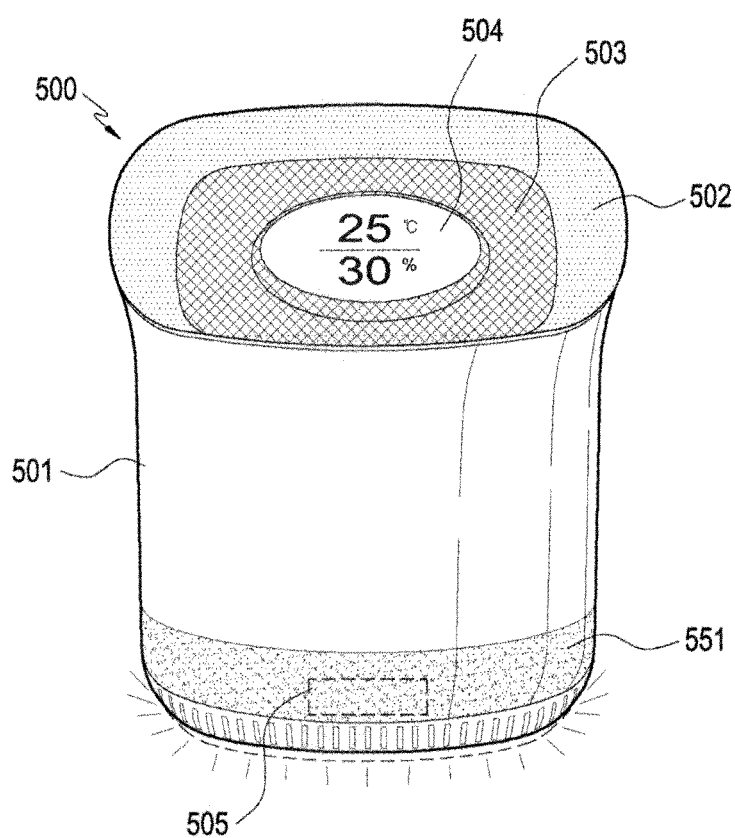
FIG. 14 is a perspective view illustrating an air condition measurement apparatus according to another of various embodiments of the disclosure.

FIG. 14 is a perspective view showing an air condition measurement apparatus according to another of various embodiments of the disclosure.

Referring to FIG. 14, an air condition measurement apparatus 500 according to another of various embodiments of the disclosure may include a housing 501, a first display unit 502, a second display unit 503, and a third display unit 551, and a description of the elements the same as or similar to those in the above embodiments will be omitted.

The first display unit 502 may be arranged on the upper side of a housing 501, and may output a color corresponding to a first value of air condition inside the housing 501.

The second display unit 503 may output the temperature and humidity of the room where the air measurement apparatus is provided using a temperature sensor and a humidity sensor mounted on the housing.

The third display unit 551 may output a color corresponding to a third value of outdoor air condition using an output device 505 provided at the lower portion of the housing 501. For example, if the first value is lower than the third value, the first display unit 502 may output a blue color, and the third display unit 551 may output a red color. The user may view the colors of the first and third display units 502 and 551, thereby considering whether or not to remove indoor foreign substances.

As described above, an air condition measurement apparatus according to various embodiments of the disclosure may include: a housing including a first space and a second space therein; a light-emitting unit positioned inside the housing, including a first lens, and configured to radiate light onto air introduced into the housing; a light-receiving unit positioned inside the housing, including a second lens, and configured to receive reflected light obtained by reflection of the light radiated from the light-emitting unit by foreign substances contained in the air; a blocking member through which the radiated light or the reflection light passes through and configured to separate the first space in which the light-emitting unit or the light-receiving unit is arranged from the second space; and a control unit, wherein the control unit is configured to receive a signal corresponding to the reflection light received by the light-receiving unit.

According to various embodiments of the disclosure, the blocking member may be configured in the form of a plate, and may be coupled to an inner surface of the housing.

The air condition measurement apparatus according to various embodiments of the disclosure may further include a fan configured to discharge the air inside the housing through an air outlet of the housing such that air outside the housing is introduced into the housing through an air inlet of the housing.

According to various embodiments of the disclosure, the fan may be positioned at the air outlet.

The air condition measurement apparatus according to various embodiments of the disclosure may further include a memory electrically connected to the control unit, wherein the control unit may perform control so as to increase the rotation of the fan on the basis of the difference between a first value of a measured air condition and a second value of air condition stored in the memory. wherein the first value of the measured air condition is measured by comparing the signal received from the light-receiving unit with a predetermined value stored in the memory.

According to various embodiments of the disclosure, the control unit may control the rotational speed of the fan at every predetermined time.

The air condition measurement apparatus according to various embodiments of the disclosure may further include a communication module configured to transmit and receive a radio signal, wherein the control unit may perform control so as to increase the rotation of the fan on the basis of the difference between the first value of the measured air condition and a third value of air condition received through the communication module.

The air condition measurement apparatus according to various embodiments of the disclosure may further include a vibration unit arranged on one side of the blocking member and configured to generate vibrations so as to remove foreign substances attached to the blocking member.

According to various embodiments of the disclosure, the vibration unit may include a piezoelectric element, and may be arranged to be spaced apart from one end of the blocking member.

According to various embodiments of the disclosure, the control unit may be configured to control the vibration unit so as to generate the vibration upon receiving specified information through the communication module.

The air condition measurement apparatus according to various embodiments of the disclosure may further include support members coupled to an inner surface of the housing and supporting the blocking member, wherein the support members may include: a first support member; a second support member spaced apart from the first support member and supporting the blocking member; and buffer members arranged on one side of the first support member or on one side of the second support member.

According to various embodiments of the disclosure, the buffer members may include: a first buffer member attached to one side of the first support member and having a round shape; and a second buffer member attached to one side of the second support member, which faces the one side of the first support member, and having a round shape, wherein the first buffer member may be arranged so as not to face the second buffer member.

The air condition measurement apparatus according to various embodiments of the disclosure may further include an opening provided on one side of the housing, through which the blocking member is inserted/taken out.

According to various embodiments of the disclosure, the light-emitting unit and the light-receiving unit may be arranged on the blocking member.

An air condition measurement method according to various embodiments of the disclosure may include: radiating light using a light-emitting unit positioned inside a housing so as to pass through a blocking member preventing foreign substances from adhering to a first lens of the light-emitting unit; receiving reflected light obtained by reflection of the radiated light from the light-emitting unit by foreign substances contained in the air inside the housing via the blocking member using a light-receiving unit positioned inside the housing; receiving a signal corresponding to the received reflection light from the light-receiving unit; and measuring a first value of air condition by comparing the signal received from the light-receiving unit with a predetermined value stored in a memory using a control unit.

The air condition measurement method according to various embodiments of the disclosure may further include: driving a fan at a first rotational speed such that air is introduced into the housing; receiving a second value of air condition stored in the memory; and increasing the rotation of the fan so as to remove the foreign substances inside the housing on the basis of the difference between the first value and the second value.

The air condition measurement method according to various embodiments of the disclosure may include measuring a first value of air condition inside the housing after removing the foreign substances inside the housing.

The air condition measurement method according to various embodiments of the disclosure may further include: driving the fan at a first rotational speed such that air is introduced into the housing; receiving a third value of air condition outside the housing using a communication module of the housing, which is connected to a network; receiving a signal corresponding to the third value from the communication module; and increasing the rotation of the fan so as to remove the foreign substances inside the housing on the basis of a difference between the first value and the third value.

The air condition measurement method according to various embodiments of the disclosure may further include driving the fan at a second rotational speed greater than the first rotational speed every predetermined time.

The air condition measurement method according to various embodiments of the disclosure may further include generating vibration through a vibration unit arranged on one side of the blocking member.

While the disclosure has been shown and described with reference to certain embodiments thereof, it will be understood by those skilled in the art that various changes in form and details may be made therein without departing from the spirit and scope of the disclosure as defined by the appended claims.

What is claimed is:

1. An air condition measurement apparatus comprising:
a housing comprising a first space and a second space therein;
a light-emitting unit positioned inside the housing, comprising a first lens, and configured to radiate light onto air introduced into the housing;
a light-receiving unit positioned inside the housing, comprising a second lens, and configured to receive reflected light obtained by reflection of the light radiated from the light-emitting unit by foreign substances contained in the air;
a blocking member through which the radiated light or the reflected light passes through and configured to separate the first space in which the light-emitting unit or the light-receiving unit is arranged from the second space; and
a control unit,
wherein the control unit is configured to receive a signal corresponding to the reflected light received by the light-receiving unit,
wherein the air condition measurement apparatus further comprises:
a fan configured to discharge the air inside the housing through an air outlet of the housing such that air outside the housing is introduced into the housing through an air inlet of the housing, wherein the fan is disposed at the air outlet;
a memory electrically connected to the control unit; and
a communication module configured to transmit and receive a radio signal,
wherein the control unit is configured to perform control so as to increase rotational speed of the fan on the basis of a difference between a first value of a measured air condition and a second value of air condition stored in the memory, and
wherein the control unit is configured to control the rotational speed of the fan at every predetermined time,
wherein the first value of the measured air condition is measured by comparing the signal received from the light-receiving unit with a predetermined value stored in the memory,
wherein the control unit is configured to perform control so as to increase the rotational speed of the fan on the basis of a difference between the first value of the measured air condition and a third value of air condition received through the communication module.

2. The air condition measurement apparatus of claim 1, wherein the blocking member is configured in a form of a plate and is coupled to an inner surface of the housing.

3. The air condition measurement apparatus of claim 1, further comprising support members coupled to an inner surface of the housing and supporting the blocking member, wherein the support members comprise:
a first support member;
a second support member spaced apart from the first support member and supporting the blocking member; and
buffer members arranged on one side of the first support member or on one side of the second support member,
wherein the buffer members comprise:
a first buffer member attached to one side of the first support member and having around shape; and
a second buffer member attached to one side of the second support member, which faces the one side of the first support member, and having a round shape, and
wherein the first buffer member is arranged so as not to face the second buffer member.

4. The air condition measurement apparatus of claim 1, further comprising an opening provided on one side of the housing, through which the blocking member is inserted/taken out.

5. The air condition measurement apparatus of claim 1, wherein the light-emitting unit and the light-receiving unit are arranged on the blocking member.

6. The air condition measurement apparatus of claim 1, further comprising a vibration unit arranged on one side of the blocking member and configured to generate vibration so as to remove foreign substances attached to the blocking member, wherein the vibration unit comprises a piezoelectric element.

7. The air condition measurement apparatus of claim 6, wherein the control unit is configured to control the vibration unit so as to generate the vibration upon receiving specified information through the communication module.

* * * * *